Nov. 25, 1947.  C. FIORENZA  2,431,387
DETACHABLE HANDLE FOR UTENSILS
Filed June 5, 1946
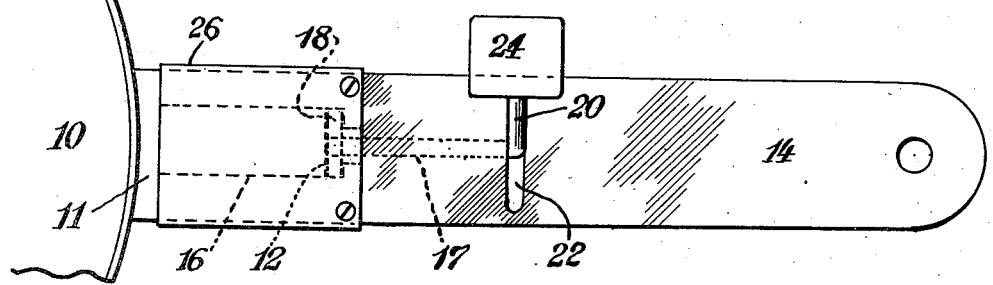
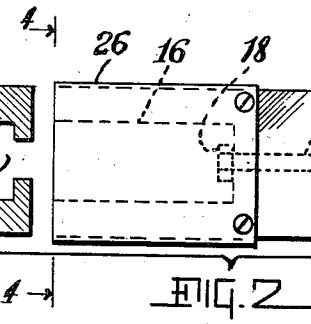
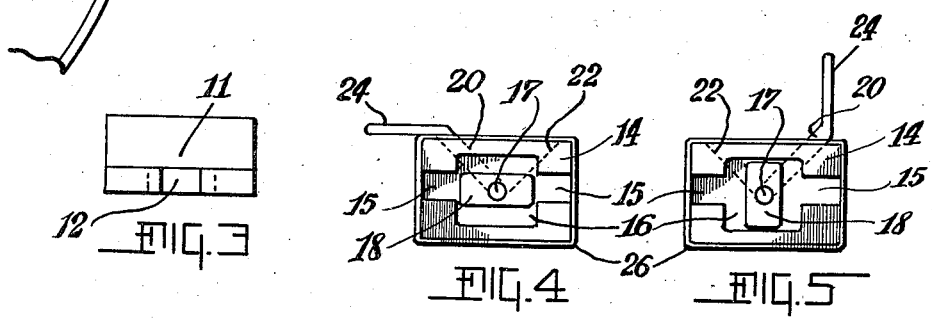
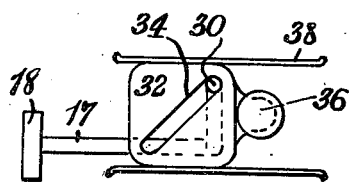
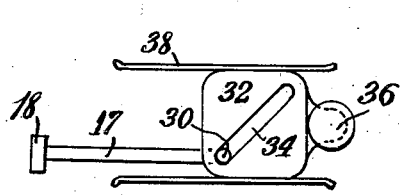
CASTENZIO FIORENZA
INVENTOR
ATTORNEY Patented Nov. 25, 1947

2,431,387

UNITED STATES PATENT OFFICE 2,431,387

DETACHABLE HANDLE FOR UTENSILS

Castenzio Fiorenza, Elmhurst, N. Y.

Application June 5, 1946, Serial No. 674,518

3 Claims. (Cl. 16—114)

1

The object of this invention is to provide a detachable handle for utensils characterized by extreme simplicity of design and construction, a relatively few number of parts and ease of operation. The construction and advantages of the invention will be understood from the following specification and the accompanying drawing in which Fig. 1 is a plan view showing the handle attached to a utensil.

Fig. 2 shows the handle detached from the utensil.

Fig. 3 is an end view of a handle lug on the utensil.

Figs. 4 and 5 are end views of the handle taken on the line 4—4 of Fig. 2 and showing certain parts in different positions.

Figs. 6 and 7 illustrate a modification.

Referring to Figs. 1-5, a utensil is indicated at 10. A handle lug 11 is secured to the side of the utensil and extends therefrom in a horizontal direction. The lug is a flat member provided with a T-slot 12 in the plane of the lug.

The handle 14 is preferably of a suitable insulating material. At its inner end the handle has a transverse slot 15 adapted to receive the lug 11. The handle also has a recess 16 through which a bolt shaft 17 with locking bolt 18 may be inserted into the handle. The recess 16 forms a space within which the bolt may be turned to lock and unlock the handle from the lug 11, see Figs. 4 and 5. The bolt shaft 17 carries at its outer end an operating arm 20 which extends upwards through a V-slot 22 as shown. The sides of the V-slot are at an angle of forty five degrees. A sleeve 26 is secured to the inner end of the handle and serves as a guide in attaching and detaching the handle. It also prevents the entrance of dirt into the locking mechanism.

In Fig. 2 the thumb piece 24 has been moved to one side of the slot 22 into an upright position (Fig. 5) thereby indicating that the bolt 18 is unlocked from the T-slot 12 and the handle may then be detached. Fig. 1 shows the handle attached to the utensil. The handle has been pushed onto the handle lug 11 with the bolt in its vertical unlocked position so that it may enter the slot 12. Thereafter the thumb piece 24 is moved to the other side of the slot 22 into locked position (Fig. 4) and the bolt 18 is now locked within the slot 12 as will be understood. The handle is now attached to the utensil and cannot be removed unless the bolt is unlocked.

The parts are so arranged that when the handle has been pushed against the utensil, the

2 handle lug abuts the inner end of the recess 16 in position to receive the bolt 18. The user then turns the thumb piece to operate the bolt. The sides of the V-slot 22 form definite stops for the movements of the thumb piece. The user simply snaps the piece from one side of the slot to the other side so there is no confusion or uncertainty of operation. It will be noticed that the inner end of the handle with the sleeve 26 provides good lengthwise engagement between the handle and the utensil so that even relatively heavy utensils may be lifted and moved about.

Figs. 6 and 7 illustrate a modification in which the bolt operating arm is actuated by means of a sliding plate. In this modification the shaft 17 carries an operating arm 30 which is actuated by a sliding plate 32 having an inclined slot 34 which engages the arm. In Fig. 6 the plate has been moved towards the utensil, not shown, to rotate the shaft 17 to place the bolt 18 in locked position. The reverse operation is shown in Fig. 7. The plate may have a push button 36 whereby to operate the plate between suitable guides 38.

I claim:

1. In combination, a flat handle lug on a utensil extending laterally therefrom and having a T-slot at its outer free end, a handle adapted to be pushed onto said handle lug to attach the handle to the utensil, said handle having at its inner end a slot to receive and enclose said handle lug when the handle is attached, a turnable bolt in the handle adapted to be moved into a locked position to engage said T-slot in the lug to lock the handle thereto and to the utensil, and adapted to be moved into an unlocked position for withdrawal from said T-slot when the handle is to be detached from the utensil and an operating arm connected to said bolt for actuating the same from outside the handle.

2. In combination, a handle lug on a utensil extending therefrom, a handle adapted to engage said lug, the latter having a slot, a concealed turnable bolt in said handle adapted to engage the said slot to lock the handle to the utensil, a shaft in the handle for operating the bolt, an operating arm on said shaft extending to the outside of the handle and a thumb piece on said arm to actuate the same to move the bolt into and out of engagement with the slot in the handle lug for attaching and detaching the handle from the utensil.

3. In combination, a handle lug on a utensil extending from the side thereof, said lug having a T-slot in its free end, a handle having a recess to receive said handle lug when the handle is attached to the utensil, a bolt in said recess at the inner end thereof, said bolt being adapted to be moved into locking and unlocking positions to engage or disengage said T-slot, a shaft concealed in said handle and connected to the bolt to operate the same, an operating arm on said shaft extending upwardly therefrom to the outside of the handle, a V-slot in the handle for guiding said arm in its operating movements, a thumb piece on the arm for moving the same from one side of said V-slot to the other side thereof to rotate the said shaft to position the bolt in locked or unlocked position and a sleeve on the inner end of the handle to close the sides of the recess therein and serve as a guide in attaching and detaching the handle.

CASTENZIO FIORENZA.

REFERENCES CITED

The following references are of record in the file of this patent:

UNITED STATES PATENTS

| Number | Name | Date |
| --- | --- | --- |
| 1,577,470 | Koehler | Mar. 23, 1926 |